United States Patent
Campbell et al.

(10) Patent No.: US 7,451,417 B1
(45) Date of Patent: Nov. 11, 2008

(54) TIMING ANNOTATION ACCURACY THROUGH THE USE OF STATIC TIMING ANALYSIS TOOLS

(75) Inventors: Scott J. Campbell, Longmont, CO (US); Mario Escobar, Boulder, CO (US); Jaime D. Lujan, Louisville, CO (US); Walter A. Manaker, Jr., Boulder, CO (US); Brian D. Philofsky, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 224 days.

(21) Appl. No.: 11/433,127

(22) Filed: May 12, 2006

(51) Int. Cl.
    *G06F 17/50* (2006.01)
(52) U.S. Cl. .................... 716/6; 716/4; 716/5
(58) Field of Classification Search .......... 716/4–6
    See application file for complete search history.

(56) References Cited

U.S. PATENT DOCUMENTS

| | | | |
|---|---|---|---|
| 5,517,658 A * | 5/1996 | Gluss et al. | 716/6 |
| 6,480,817 B1 * | 11/2002 | Peters et al. | 703/15 |
| 6,487,701 B1 * | 11/2002 | Dean et al. | 716/4 |
| 6,557,150 B1 * | 4/2003 | Honmura et al. | 716/6 |
| 6,611,948 B1 | 8/2003 | Tyler et al. | |
| 6,857,110 B1 * | 2/2005 | Rupp et al. | 716/4 |
| 2003/0014724 A1 | 1/2003 | Kojima et al. | |
| 2003/0110462 A1 | 6/2003 | Cohn et al. | |
| 2005/0268266 A1 | 12/2005 | Bowers et al. | |
| 2006/0066317 A1 | 3/2006 | Koch et al. | |
| 2006/0230373 A1 | 10/2006 | Dirks et al. | |
| 2007/0011527 A1 | 1/2007 | Goswami et al. | |
| 2007/0089076 A1 | 4/2007 | Amantangelo | |

OTHER PUBLICATIONS

U.S. Appl. No. 12/047,502, filed Mar. 13, 2008, Lujan et al.
U.S. Appl. No. 11/333,863, filed Jan. 17, 2006, Campbell et al.

* cited by examiner

*Primary Examiner*—Jack Chiang
*Assistant Examiner*—Brandon W Bowers
(74) *Attorney, Agent, or Firm*—Kevin Cuenot; Michael R. Hardaway

(57) ABSTRACT

A method of generating timing information for a circuit design can include determining static timing data for the circuit design and identifying a source of timing information for use in functional simulation of the circuit design. The method also can include updating the source of timing information to include at least a portion of the static timing data.

13 Claims, 4 Drawing Sheets

TIMING ANNOTATION ACCURACY THROUGH THE USE OF STATIC TIMING ANALYSIS TOOLS

BACKGROUND

1. Field of the Invention

The present invention relates to the field of circuit design and, more particularly, to circuit design simulations.

2. Description of the Related Art

The operational speed of modern circuit designs has continually increased. This increase in speed requires highly accurate techniques for ensuring that the circuit design will operate as expected. The circuit design is expressed using some variety of hardware description language and then tested and/or verified using one or more software-based simulation tools. Typically, testing involves subjecting the circuit design to both functional simulation and static timing analysis.

In general, functional simulation refers to the process of ensuring that the logic of the circuit design is correct. Unlike static timing analysis, functional simulation involves the application of user specified input vector(s) to the circuit design. Only the signal paths within the circuit design that are exercised by the applied input vector(s) are evaluated. Accordingly, it may be the case that one or more signal paths in the design are not exercised by a given set of input vectors, and thus, are not evaluated. In fact, the complexity of modern circuit designs makes it difficult to create a set of input vectors that will unquestionably exercise each signal path.

Though functional simulation involves the verification of logic functions, timing analysis also can be performed, albeit on a different level than is performed with respect to static timing analysis. The delay information used during functional simulation typically is specified within a Standard Delay Format (SDF) file as defined by Open Verilog International. The delays specified in an SDF file are fixed in that each represents a timing parameter of the circuit design under a different set of physical circumstances relating to temperature, voltage, or the like. These fixed delays represent delays associated with different components of the circuit design under what can be considered extreme operating conditions, i.e. in terms of a maximum and a minimum. In consequence, the delay information used for functional simulation covers a range of scenarios, but does not reflect variations in conditions that occur during normal operation of the circuit design.

By comparison, static timing analysis involves no input vectors. Instead, static timing analysis can evaluate all possible paths of a circuit design and can indicate a worst case scenario in terms of the delay information that is created on a per signal path basis. The delay information generated during static timing analysis reflects delay variations that may occur during normal operation of a circuit design. Examples of these variations can include, but are not limited to, clock skew, clock uncertainty, or the like. A static timing analysis engine, for example, can determine clock uncertainty for a combination of two or more clock domains. Still, static timing analysis is unable to account for dynamic behavior of the circuit design, i.e. when an input is applied.

In consequence, there can be, and often is, a difference in the results obtained between functional simulation and static timing analysis for the same circuit design. More particularly, the timing information used in functional simulation can be overly optimistic with respect to the signal path delays used. It would be beneficial to provide a technique for improving analysis of circuit designs which overcomes the limitations described above.

SUMMARY

The present invention provides methods and articles of manufacture relating to timing analysis of circuit designs. One embodiment of the present invention can include a method of generating timing information for a circuit design. The method can include determining static timing data for the circuit design and identifying a source of timing information for use in functional simulation of the circuit design. The source of timing information can be updated to include at least a portion of the static timing data.

Functional simulation can be performed upon the circuit design using the source of timing information for the circuit design that comprises the static timing data. The source of timing information can be formatted as a Standard Delay Format file. In one embodiment, the static timing data can specify an adjustment to a setup requirement for a pin pair of a synchronous element of the circuit design. The adjustment can depend upon clock uncertainty, a difference between maximum and minimum clock arrival time, or any combination thereof. In another embodiment, the static timing data can specify an adjustment to a hold requirement for a pin pair of a synchronous element of the circuit design. The adjustment can depend upon clock uncertainty, a difference between maximum and minimum clock arrival time, or any combination thereof.

Another embodiment of the present invention can include a method of generating timing information for a circuit design. The method can include determining a timing adjustment for one or more pin pairs of the circuit design, wherein the timing adjustment depends upon a measure of clock uncertainty, and updating a timing record corresponding to the pin pair within a source of timing data for use with functional simulation of the circuit design. The method also can include using the updated timing record(s) during functional simulation of the circuit design.

In one embodiment, the timing adjustment can be a setup adjustment. In that case, determining a timing adjustment can include selecting a longest path to a data pin of the pin pair and identifying a type of a source for the longest path to the data pin. Determining a timing adjustment further can include calculating at least one measure of clock uncertainty relating to a setup requirement covering the pin pair, wherein the measure of clock uncertainty depends upon the type of source of the longest path to the data pin, and calculating at least one minimum delay adjustment relating to the setup requirement for the pin pair.

Updating a timing record can include selecting a largest of the minimum delay adjustments for the pin pair, selecting a largest of the measures of clock uncertainty for the pin pair, and updating a setup record for the pin pair according to a sum of the largest minimum delay adjustment and the largest measure of clock uncertainty for the pin pair.

In another embodiment, the timing adjustment can be a hold adjustment. Accordingly, determining a timing adjustment can include selecting a shortest path to a data pin of the pin pair and identifying a type of a source for the shortest path to the data pin. Determining a timing adjustment further can include calculating at least one measure of clock uncertainty relating to a hold requirement for the pin pair, wherein the measure of clock uncertainty depends upon the type of the source of the shortest path to the data pin, and calculating at least one maximum delay adjustment relating to the hold requirement for the pin pair.

In the case of a hold adjustment, updating a timing record can include selecting a largest of the maximum delay adjustments for the pin pair, selecting a largest of the measures of clock uncertainty for the pin pair, and updating a hold record for the pin pair according to a sum of the largest maximum delay adjustment and the largest measure of clock uncertainty for the pin pair.

Yet another embodiment of the present invention can include a machine readable storage, having stored thereon a computer program having a plurality of code sections for causing a machine to perform the various steps and/or functions disclosed herein.

BRIEF DESCRIPTION OF THE DRAWINGS

There are shown in the drawings, embodiments which are presently preferred, it being understood; however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The present invention provides a solution for performing an accurate functional simulation for a circuit design. In accordance with the embodiments disclosed herein, static timing analysis can be performed on a circuit design to derive accurate timing information. The timing information that typically is used in performing functional simulation can be updated with, or created from, the data obtained from the static timing analysis. When functional simulation is performed, the updated timing data can be used. By using more detailed, or accurate, timing information obtained from static timing analysis, the likelihood of functionally simulating the circuit design in an overly optimistic fashion is reduced, if not eliminated. That is, the likelihood of simulating a circuit design using timing values that are not likely to be met or be accurate when the circuit design is actually constructed on the target device is reduced. In consequence, the differences in results between functional simulation and static timing analysis when performed on the same circuit design are reduced.

Figure 1:
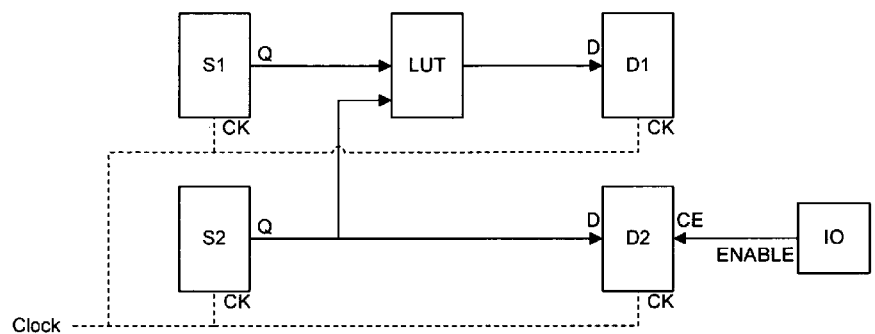
FIGS. 1-3 are block diagrams of a circuit design which are useful for understanding the embodiments disclosed herein.
Figure 2:
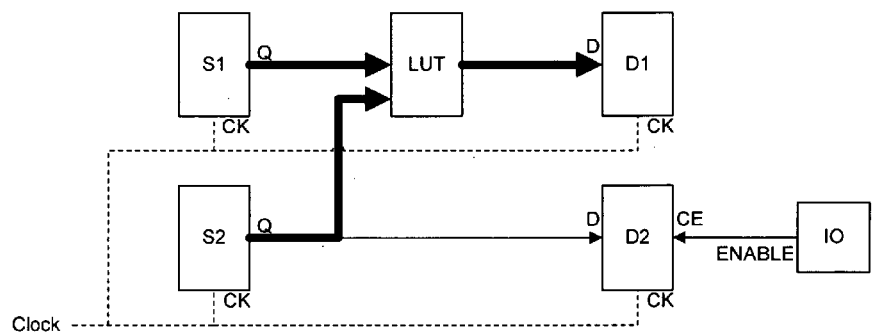
Figure 3:
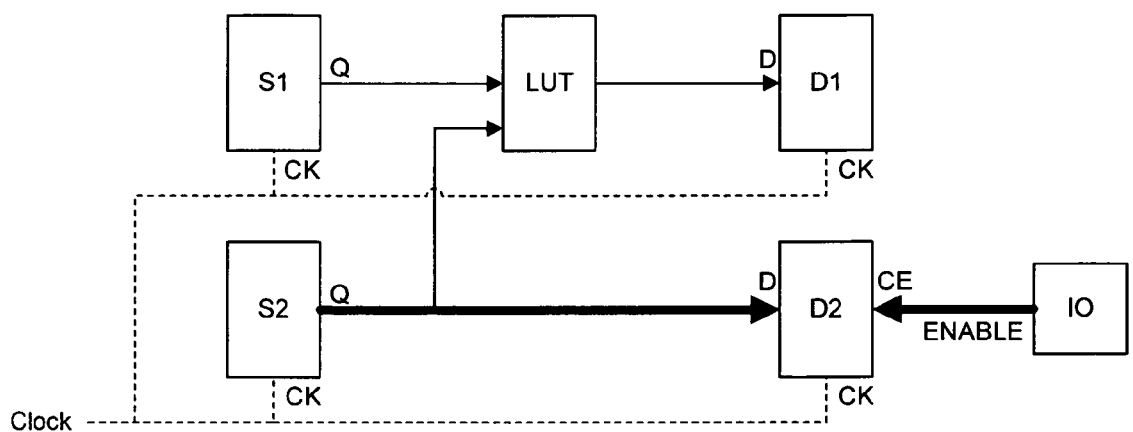

FIGS. 1-3 are block diagrams of a circuit design 100 which are useful for understanding the embodiments disclosed herein. FIGS. 1-3 illustrate the various types of detailed adjustments that can be calculated using a static timing analysis engine (STAE). Consider the clock and data paths illustrated with reference to FIG. 1. As shown, source register S1 has a path to the destination register D1 via the LUT. Source register S2 has a path to each of destination registers D1 and D2. A path from primary input ENABLE to destination register D2 also exists.

In FIG. 2, the paths that would be analyzed for a timing constraint covering destination register D1 are illustrated in bold. In accordance with one embodiment of the present invention, a setup and hold adjustment for the setup and hold records for pin pair D1.D to D1.CK can be created. Because pin D1.D has two possible sources, the setup and hold adjustments for pin pair D1.D to D1.CK must be the maximum of the adjustments from sources S1 and S2 to D1. This plurality of paths can be specified in one or more timing constraints. Accordingly, the setup and hold adjustments for pin pair D1.D to D1.CK can be the maximum adjustments for any path to D1.D.

FIG. 3 illustrates the paths that would be analyzed pertaining to a constraint covering destination register D2. In this case, a setup and hold adjustment for the setup and hold records for pin pair D2.D to D2.CK and pair D2.CE to D2.CK can be calculated. A setup and/or hold record can be specified for each pin pair, comprising a data pin and a clock pin used to time that data pin, for a given synchronous element of a circuit design. Thus, it should be appreciated that a synchronous element of a circuit design can have a single setup and/or hold record, such as in the case of a simple register, or a plurality of setup and/or hold records, such as in the case of a microprocessor. Regardless, adjustments can be determined for each unique setup and hold record.

FIGS. 1-3 illustrate that one or more setup and/or hold records can exist for each pin of a circuit element. More particularly, each record can pertain to a pair of pins, i.e. a data pin and at least one clock pin. The setup and/or hold records indicate timing information for a data pin relative to a given clock pin or a plurality of clock pins, such as in the case of a data pin having a requirement relative to a reset data pin of a CPU having multiple clocks. These records, which typically are accessed during functional simulation, can be adjusted using timing information derived from an STAE. Since a given register can be referenced by one or more timing constraints, the worst-case, or maximum, adjustment may be computed from a plurality of constraints. More particularly, the worst-case adjustment can be computed from, for example, a minimum hold path and a maximum setup path for each constraint.

Figure 4:
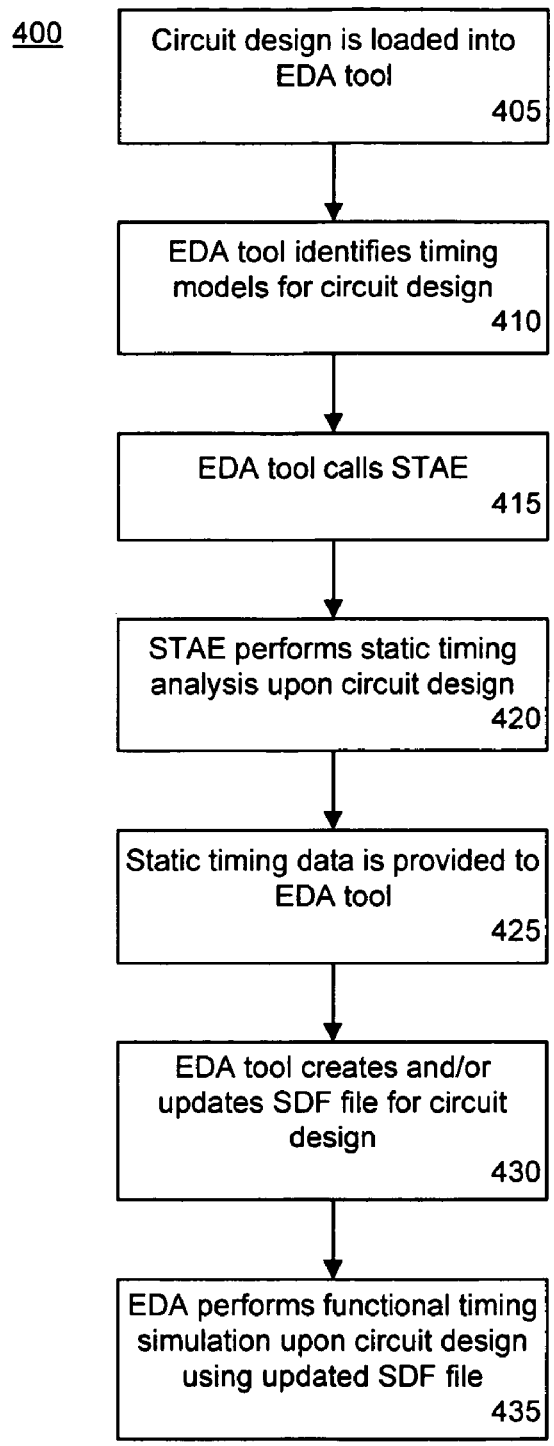
FIG. 4 is a flow chart illustrating a method of determining timing information for use with a functional simulation tool in accordance with one embodiment of the present invention.

FIG. 4 is a flow chart illustrating a method 400 for determining timing information for use with functional simulation in accordance with one embodiment of the present invention. Method 400 can begin in step 405 where a circuit design is loaded into an Electronic Design Automation (EDA) tool. The circuit design, which can be specified using a hardware description language or other programmatic representation, can be loaded into an EDA tool that is configured to perform functional simulation. One example of such an EDA tool can include Netlist Generator, referred to as NetGen, as is commercially available from Xilinx, Inc. of San Jose, Calif.

In step 410, the EDA tool can identify the timing models for the various components incorporated within the circuit design. The timing models can be accessed from a library of such models available to, or included within, the EDA tool. In step 415, the EDA tool can call an STAE. In calling the STAE, the EDA tool can provide or pass necessary information to the STAE such as a reference to the circuit design as well as references to any models that were identified in step 410.

In one embodiment of the present invention, the STAE can be implemented as the Xilinx Timing Analyzer, which also is commercially available from Xilinx, Inc. The Xilinx Timing Analyzer is a software-based tool that performs static timing analysis on field programmable gate array (FPGA) or other complex programmable logic device designs. The static timing analysis is performed after synthesis, mapping, placing, and routing to create detailed timing reports for the circuit design.

An STAE can calculate detailed and accurate timing, or delay, information for a circuit design. In illustration, an STAE can account for quantities such as clock uncertainty, clock skew, as well as other quantities that are not considered during functional simulation. Further, the calculations are performed with specific knowledge of the target device itself, particularly since the STAE is usually available from the manufacturer of the target device.

Clock uncertainty, as used herein, can be viewed as the sum of one or more different delay quantities that arise from any of a variety of different sources. For example, jitter can be a significant cause of clock uncertainty. Jitter can arise from noise and/or crosstalk on the clock distribution network on the target device, jitter inherent in an external clock source provided to the target device, discrete jitter from clock generation circuitry, i.e. from a multiplexer or phase lock loop, as well as phase error and/or duty cycle error.

In step 420, the STAE performs a static timing analysis upon the circuit design. As noted, the STAE can determine delays for the various components and/or paths of the circuit design that account for effects such as clock skew, clock uncertainty, and the like. In step 425, results from the static timing analysis performed by the STAE, i.e. static timing data, can be passed back to the EDA tool, where a source of timing data for the circuit design can be identified. Accordingly, in step 430, the EDA tool can incorporate the static timing data, or portions thereof, into the source of timing data for the circuit design. Alternatively, the EDA tool can create a source of timing data for the circuit design that includes portions, or all, of the static timing data. While the source of timing data can be specified in any of a variety of different formats, in one embodiment, the source of timing data can be specified using a Standard Delay Format (SDF) file.

An SDF file can specify delay information for various components of the circuit design. Constructs such as SETUP, HOLD, and SETUPHOLD can be annotated with the static timing data. That is, information specified in these constructs can be updated using the static timing analysis data such that the constructs specify more accurate data that accounts for the various physical phenomena measured by the STAE noted herein. It should be appreciated, however, that the present invention is not intended to be limited to modifying and/or annotating only these constructs as any construct that may be specified within the SDF file can be annotated, and particularly those constructs which specify quantities affected or influenced by timing information determined by the STAE.

For example, the information that may be specified by, and updated within, an SDF file can include, but is not limited to, minimum, typical, and maximum path delays for individual pins of a circuit design; timing checks such as setup; hold, recovery, removal, skew, width, and period; timing constraints; as well as conditional and unconditional module path delays and timing checks. Information included within an SDF file is specified in a design tool-independent manner.

In any case, whether the source of timing information for the circuit design is updated or created using the static timing data, one or more software constructs within the source of timing information pertaining to specific pins can include or reflect items of static timing data. Accordingly, in step 435, the EDA tool can perform functional simulation upon the circuit design using the source of timing information. Since the source of timing information for the circuit design, i.e. an SDF file, incorporates more accurate timing information as determined using the STAE, the functional simulation performed upon the circuit design using the EDA tool provides improved timing accuracy that more closely tracks the results obtained from static timing analysis.

It should be appreciated that the Xilinx Timing Analyzer and NetGen are presented as exemplary software-based tools which can be used cooperatively to implement the various embodiments disclosed herein. These embodiments are not intended to be limited, however, by the particular STAE and/or EDA tool used. Accordingly, any suitable EDA tool or STAE can be used provided that it functions substantially as described herein.

Figure 5:
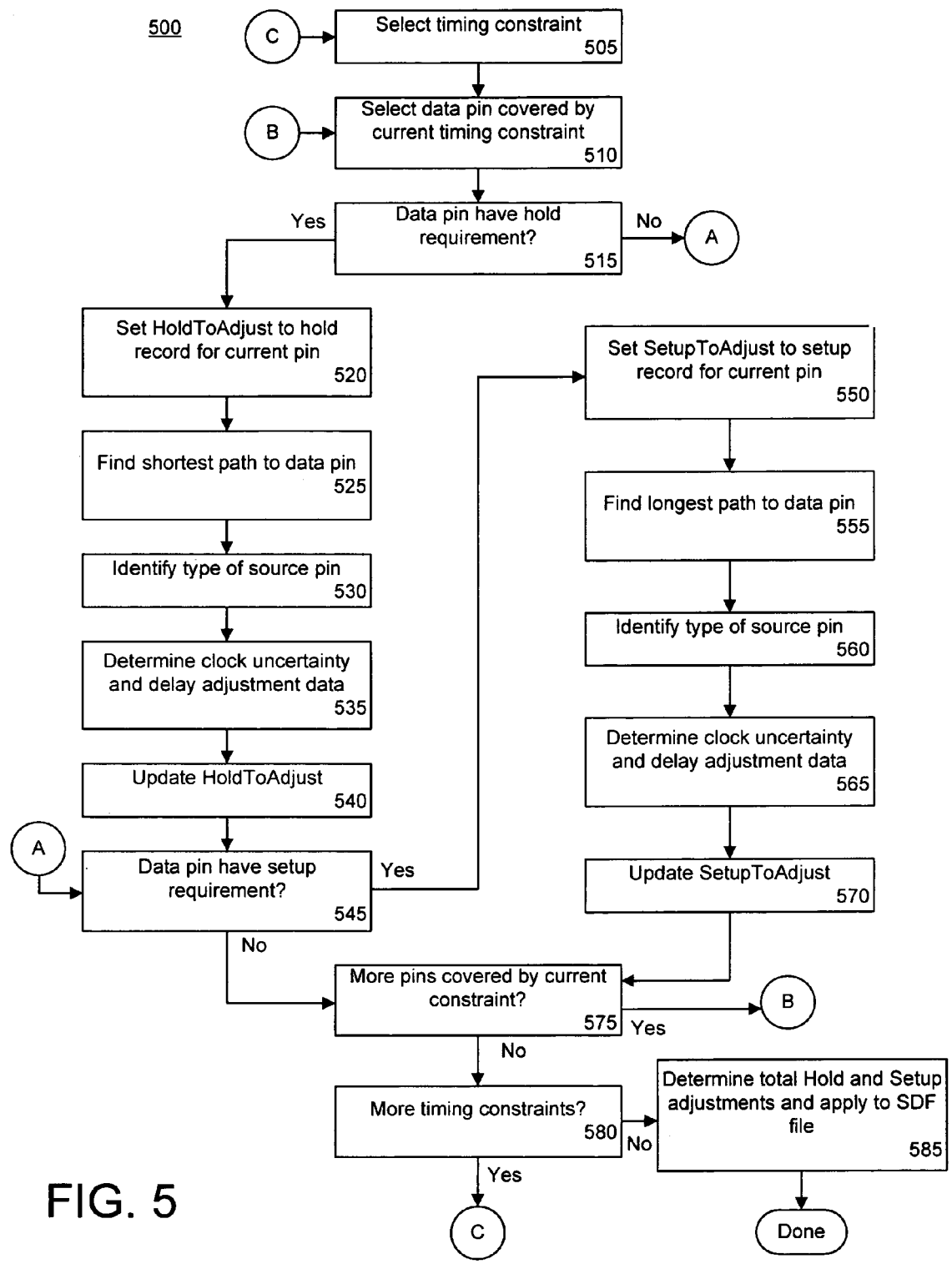
FIG. 5 is a flow chart illustrating a method of determining static timing information for use in functional simulation of a circuit design in accordance with another embodiment of the present invention.

FIG. 5 is a flow chart illustrating a method 500 of determining static timing information for use in functional simulation of a circuit design in accordance with another embodiment of the present invention. Method 500 can be performed by an STAE to determine more detailed and/or accurate delay information for a circuit design. The static timing information can be applied to an SDF file, or other collection of delay information for a circuit design, to be used during functional simulation.

Accordingly, method 500 can begin in step 505, where a timing constraint for a circuit design is selected. The timing constraint typically specifies one or more design objectives for the circuit design in terms of signal propagation delay, skew, or the like. As noted, a timing constraint can apply to, or cover, one or more pins. In step 510, a data pin of the circuit design that is covered by the selected timing constraint can be selected. In step 515, a determination can be made as to whether the data pin that was selected in step 510 has a hold requirement with respect to a clock pin associated with, or controlling, that data pin. The data pin and a clock pin regulating that data pin, together, constitute a pin pair. If the data pin has a hold requirement, the method can proceed to step 520. If not, the method can proceed to step 545.

Continuing with step 520, where the selected data pin has a hold requirement, a data structure called HoldToAdjust can be set to indicate or store the clock pin register hold record for the currently selected data pin. The HoldToAdjust data structure can include a variable, referred to as HoldToAdjust.UncertaintyAdjustment, for storing adjustment data relating to clock uncertainty. The HoldToAdjust data structure further can include a variable, referred to as HoldToAdjust.DelayAdjustment, for storing adjustment data derived from maximum and minimum clock arrival times. HoldToAdjust.UncertaintyAdjustment and HoldToAdjust.DelayAdjustment can be initialized to a predetermined value such as zero.

In step 525, the shortest path, in terms of signal delay, to the selected data pin can be identified along with the delay associated with that path. Selection of the shortest path as a reference for timing/delay information adjustments ensures that the circuit is not simulated using overly optimistic timing information, i.e. delays for signal paths that are too short and, thus, are not attainable when the circuit design is physically implemented on a target device.

In step 530, the type of the source pin for the shortest path to the data pin can be identified. More particularly, a determination can be made as to whether the source pin is a primary input pin or a clock pin. A primary input pin, as used herein, can refer to an input to the programmable logic device upon which the circuit design is to be implemented. A clock pin, by comparison, can refer to a register-to-register path. The source pin type influences the way in which various timing-related quantities are determined using the STAE. In illustration, quantities relating to adjustments for clock uncertainties and time delay measurements for minimum and maximum clock arrival times can be computed and vary based upon the type of source pin identified.

Thus, in step 535, values for clock uncertainty (UncertaintyAdjustment$_{Current}$), maximum time delay (max(Td)), minimum time delay (min(Td)), as well as a current minimum delay adjustment parameter (DelayAdjustment$_{Current}$) can be determined. In the case where the source pin is identified as a primary input pin, the UncertaintyAdjustment$_{Current}$ can be set equal to the clock uncertainty for the I/O hold clock path to the data pin. That is, UncertaintyAdjustment$_{Current}$ can reflect the clock uncertainty for the clock pin on the register that clocks a primary input path into the device. Max(Td) can be set to the maximum hold clock arrival time to the clock pin for the I/O hold clock path. Min(Td) can be set equal to the minimum clock arrival time to the clock pin for the I/O hold clock path. DelayAdjustment$_{Current}$ can be set equal to the difference between max(Td) and min(Td).

In the case where the source pin is identified as a clock pin, UncertaintyAdjustment$_{Current}$ can be set equal to the clock uncertainty between the source and destination clocks that clock the data path. Max(Td) can be set to the maximum clock arrival time for path clock pins used in the skew calculation. Min(Td) can be set equal to the minimum clock arrival time for path clock pins used in the skew calculation. Thus, max(Td) and min(Td) reflect the maximum and minimum clock path arrival times to the destination clock pin. DelayAdjustment$_{Current}$ can be set equal to the difference between max(Td) and min(Td).

In step 540, the HoldToAdjust parameters can be updated according to the various quantities calculated with reference to step 535. More particularly, if the UncertaintyAdjustment$_{Current}$ exceeds HoldToAdjust.UncertaintyAdjustment, HoldToAdjust.UncertaintyAdjustment can be set equal to UncertaintyAdjustment$_{Current}$. Similarly, if DelayAdjustment$_{Current}$ exceeds HoldToAdjust.DelayAdjustment, HoldToAdjust.DelayAdjustment can be set equal to the value of DelayAdjustment$_{Current}$. This ensures that the largest hold uncertainty adjustment for a given pin pair is selected and the largest hold minimum adjustment for the pin pair is selected.

Referring to step 545, a determination can be made as to whether the currently selected data pin has a setup requirement. If so, the method can proceed to step 550. If not, the method can continue to step 575. In the case where the data pin has a setup requirement, a data structure referred to as SetupToAdjust, can be set to indicate the setup record for the selected data pin in step 550. SetupToAdjust can include a variable, referred to as SetupToAdjust.UncertaintyAdjustment, relating to clock uncertainty and a variable, referred to as SetupToAdjust.DelayAdjustment, for storing adjustment data derived from maximum and minimum clock arrival times. In step 555, the longest path, in terms of signal delay, to the data pin can be identified along with the delay associated with that path. In step 560, the type of the source pin for the longest path can be identified, i.e. whether a primary input pin or a clock pin.

In step 565, values for UncertaintyAdjustment$_{Current}$, max(Td), min(Td), as well as DelayAdjustment$_{Current}$ can be determined for the setup requirements for the current data pin. In the case where the source pin is identified as a primary input pin, UncertaintyAdjustment$_{Current}$ can be set equal to the clock uncertainty for the I/O setup clock path. Max(Td) can be set to the maximum clock arrival time to the clock pin for the I/O setup clock path. Min(Td) can be set equal to the minimum clock arrival time to the clock pin for the I/O setup clock path. DelayAdjustment$_{Current}$ for setup can be set equal to the difference between max(Td) and min(Td).

In the case where the source pin was identified as a clock pin, UncertaintyAdjustment$_{Current}$ can be set equal to the clock uncertainty between the source and destination clocks that clock the data path. Max(Td) can be set to the maximum clock arrival time for path clock pins used in skew calculation(s). Min(Td) can be set equal to the minimum clock arrival time for path clock pins used in the skew calculation. Thus, max(Td) and min(Td) can be set equal to the destination clock maximum and minimum clock arrival times respectively. DelayAdjustment$_{Current}$ for setup can be set equal to the difference between max(Td) and min(Td) and correspond to a maximum delay adjustment.

In step 570, the SetupToAdjust parameters can be updated according to the various quantities calculated with reference to step 565. More particularly, with respect to setup, if UncertaintyAdjustment$_{Current}$ exceeds SetupToAdjust.UncertaintyAdjustment, SetupToAdjust.UncertaintyAdjustment can be set equal to the UncertaintyAdjustment$_{Current}$. Similarly, if DelayAdjustment$_{Current}$ exceeds SetupToAdjust.DelayAdjustment, SetupToAdjust.DelayAdjustment can be set equal to DelayAdjustment$_{Current}$.

In step 575, a determination can be made as to whether more pins are covered by the current constraint. If so, the method can proceed to step 510 and repeat as may be required, continually updating the values of HoldToAdjust.UncertaintyAdjustment, HoldToAdjust.DelayAdjustment, SetupToAdjust.UncertaintyAdjustment, and SetupToAdjust.DelayAdjustment for the selected pins as may be required. If no further pins are covered by the current constraint, the method can continue to step 580 where a determination is made as to whether more timing constraints exist to be processed. If so, the method can continue to step 505 to select another timing constraint and continue processing. If not, the method can proceed to step 585.

In step 585, the setup and hold adjustments computed for each pin pair can be applied to the setup and hold requirements for the pin pairs as specified in the SDF file. The total hold adjustment for a given pin pair can be defined as the sum of the HoldToAdjust.UncertaintyAdjustment and the HoldToAdjust.DelayAdjustment for the pin pair. The total hold adjustment for the adjustment pair can be added to the hold record for that pin pair. The total setup adjustment for a given pin pair can be defined as the sum of the SetupToAdjust.UncertaintyAdjustment and the SetupToAdjust.DelayAdjustment for the pin pair. The total setup adjustment for the pin pair can be added to the setup record for the pin pair.

The timing records for the pin pairs of the circuit design can be updated in this manner such that the resulting setup and hold records reflect worst case adjustments on a per pin pair basis. The adjustments to the setup and/or hold records for each pin pair cause functional simulation results to better correspond with the static timing analysis results. The setup and hold requirements can be applied to the SDF file when written.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A method of generating timing information for a circuit design comprising:
    determining a timing adjustment for at least one pin pair of a circuit design, wherein the timing adjustment depends upon a measure of clock uncertainty; and
    updating a timing record corresponding to the pin pair within a source of timing data for use with functional simulation of the circuit design, wherein:
        the timing adjustment is a setup adjustment; and
        wherein determining a timing adjustment comprises:
            selecting a longest path to a data pin of the pin pair; and
            identifying a type of a source for the longest path to the data pin.

2. The method of claim 1, further comprising using the updated timing record for the pin pair during functional simulation of the circuit design.

3. The method of claim 1, wherein determining a timing adjustment further comprises:
    calculating at least one measure of clock uncertainty relating to a setup requirement covering the pin pair, wherein the measure of clock uncertainty depends upon the type of source of the longest path to the data pin; and
    calculating at least one minimum delay adjustment relating to the setup requirement for the pin pair.

4. The method of claim 3, wherein updating a timing record further comprises:
    selecting a largest of the minimum delay adjustments for the pin pair;
    selecting a largest of the measures of clock uncertainty for the pin pair; and
    updating a setup record for the pin pair according to a sum of the largest minimum delay adjustment and the largest measure of clock uncertainty for the pin pair.

5. The method of claim 1, wherein the timing adjustment is a hold adjustment, wherein determining a timing adjustment further comprises:
    selecting a shortest path to a data pin of the pin pair; and
    identifying a type of a source for the shortest path to the data pin.

6. The method of claim 5, wherein determining a timing adjustment further comprises:
    calculating at least one measure of clock uncertainty relating to a hold requirement for the pin pair, wherein the measure of clock uncertainty depends upon the type of the source of the shortest path to the data pin; and
    calculating at least one maximum delay adjustment relating to the hold requirement for the pin pair.

7. The method of claim 6, wherein updating a timing record further comprises:
    selecting a largest of the maximum delay adjustments for the pin pair;
    selecting a largest of the measures of clock uncertainty for the pin pair; and
    updating a hold record for the pin pair according to a sum of the largest minimum delay adjustment and the largest measure of clock uncertainty for the pin pair.

8. A machine readable storage, having stored thereon a computer program having a plurality of code sections comprising:
    code for determining a timing adjustment for at least one pin pair of a circuit design, wherein the timing adjustment depends upon a measure of clock uncertainty; and
    updating a timing record corresponding to the pin pair within a source of timing data for use with functional simulation of the circuit design, wherein:
        the timing adjustment is a setup adjustment, and
        wherein the code for determining a timing adjustment further comprises:
            code for selecting a longest path to a data pin of the pin pair; and
            code for identifying a type of a source for the longest path to the data pin.

9. The machine readable storage of claim 8, wherein the code for determining a timing adjustment further comprises:
    code for calculating at least one measure of clock uncertainty relating to a setup requirement for the pin pair, wherein the measure of clock uncertainty depends upon the type of source of the longest path to the data pin; and
    code for calculating at least one minimum delay adjustment relating to the setup requirement for the pin pair.

10. The machine readable storage of claim 9, wherein the code for updating a timing record further comprises:
    code for selecting a largest of the minimum delay adjustments for the pin pair;
    code for selecting a largest of the measures of clock uncertainty for the pin pair; and
    code for updating a setup record for the pin pair according to a sum of the largest minimum delay adjustment and the largest measure of clock uncertainty for the pin pair.

11. The machine readable storage of claim 8, wherein the timing adjustment is a hold adjustment, wherein the code for determining a timing adjustment further comprises:
    code for selecting a shortest path to a data pin of the pin pair; and
    code for identifying a type of a source to the shortest path to the data pin.

12. The machine readable storage of claim 11, wherein the code for determining a timing adjustment further comprises:
- code for calculating at least one measure of clock uncertainty relating to a hold requirement for the pin pair, wherein the measure of clock uncertainty depends upon the type of the source of the shortest path to the data pin; and
- code for calculating at least one maximum delay adjustment relating to the hold requirement for the pin pair.

13. The machine readable storage of claim 12, wherein the code for updating timing records further comprises:
- code for selecting a largest of the maximum delay adjustments for the pin pair;
- code for selecting a largest of the measures of clock uncertainty for the pin pair; and
- code for updating a hold record for the pin pair according to a sum of the largest maximum delay adjustment and the largest measure of clock uncertainty for the pin pair.

* * * * *